Patented Feb. 22, 1944

2,342,346

UNITED STATES PATENT OFFICE 2,342,346

EGG WHITENING

James D. Ingle, Chicago, Ill., assignor to Industrial Patents Corporation, Chicago, Ill., a corporation of Delaware No Drawing. Application October 30, 1940, Serial No. 363,492

6 Claims. (Cl. 99—230)

This invention relates to the treatment of shell eggs and has to do particularly with a method of improving the color of egg shells.

It is well known that some eggs have a natural color, such as buff. The color of egg shells in many cases affects the marketability of the eggs. Many consumers prefer white shell eggs, although the color of the shell does not affect the quality of the egg material.

The principal object of this invention is to provide a method of decolorizing or improving the color of colored egg shells without affecting the egg material.

The present invention contemplates treatment of colored shell eggs with a peptizing agent whereby the color of the egg shell is substantially improved or whitened.

It has been found that peptizing agents remove from the egg shell the bloom which is a protein material containing the color. The peptizing agent causes a disintegration and removal of the bloom.

Any suitable peptizing agent may be used, although I prefer to use those having a substantial solubility in water. Examples of peptizing agents are: thiosulphates, urea, thiourea, thiocyanates, and zinc chloride. Mixtures of two or more of the foregoing peptizing agents may be used.

The peptizing agent is preferably used in a fluid or liquid form in order to facilitate proper contact with the egg shell. Aqueous solutions are preferred although other solvents in which the peptizing agent is soluble may be employed. An aqueous solution of the peptizing agent has been found to give good results.

In practicing the invention, the eggs or shells are subjected to the action of a solution of the peptizing agent and are then washed with water.

The solution of the peptizing agent may be improved by the addition of a small amount of a wetting agent, for example, the sulphonated aromatic naphthalene product known on the market as "Nacconol NR." Any wetting agent which is not destroyed or whose usefulness is not impaired by the presence of a strong acid is satisfactory for use. Other examples of wetting agents are sulphated higher alcohols, such as the commercial product "Duponol," alkylated aryl sulphontes, such as the commercial product "Santomerse," sulphated esters of higher alcohols and dibasic acids, such as the commercial product "Aerosol," and the like.

The amount of peptizing agent is not critical but in practice, I prefer to use a solution containing from about 1 per cent up to a saturated solution. Normally solutions containing about 5 per cent to 30 of the peptizing agent are used. The most satisfactory peptizing agents are solutions of urea, thiourea, and zinc chloride.

I have found that solutions containing 15 per cent of zinc chloride or 30 per cent urea produce satisfactory results for the purpose of my invention.

As an example of the operation of my invention, the eggs are immersed in the solution for a period of about five seconds to ten minutes or more and then washed with water. Buff colored shell eggs treated in accordance with this invention may be changed to a substantially white color comparable to that of the usual white color of egg shells.

Obviously many modifications and variations of the invention hereinbefore set forth may be made without departing from the spirit and scope thereof, and therefore only such limtations should be imposed as are indicated in the appended claims.

I claim:

1. The method of whitening naturally colored shell eggs, which comprises subjecting the shell to the action of a peptizing agent selected from the class consisting of thiosulphates, urea, thiourea, thiocyanates and zinc chloride, whereby the bloom is removed and the color of the egg shell substantially improved.

2. In a method of treating shell eggs, the step which comprises subjecting the shells to the action of a whitening solution, the whitening solution comprising a peptizing agent selected from the class consisting of thiosulphates, urea, thiourea, thiocyanates and zinc chloride, whereby the bloom is removed and the color of the egg shell substantially improved.

3. The method of whitening buff colored shell eggs, which comprises immersing the eggs in an aqueous solution containing a peptizing agent selected from the class consisting of thiosulphates, urea, thiourea, thiocyanates and zinc chloride, whereby the bloom is removed and the color of the egg shell substantially improved, and thereafter washing the solution from the surface of the eggs.

4. The method of whitening buff colored shell eggs, which comprises immersing the eggs in an aqueous solution containing zinc chloride for peptizing the protein material containing the color, whereby the color is removed and the egg shell whitened and thereafter washing the solution from the surface of the eggs.

5. The method of whitening buff colored shell eggs, which comprises immersing the eggs in an aqueous solution containing urea for peptizing the protein material containing the color, whereby the color is removed and the egg shell whitened, and thereafter washing the solution from the surface of the eggs.

6. The method of whitening buff colored shell eggs, which comprises immersing the eggs in an aqueous solution containing thiourea for peptizing the protein material containing the color, whereby the color is removed and the egg shell whitened and thereafter washing the solution from the surface of the eggs.

JAMES D. INGLE.